(12) United States Patent
Huelsman et al.

(10) Patent No.: US 7,734,559 B2
(45) Date of Patent: Jun. 8, 2010

(54) RULE PROCESSING METHOD AND APPARATUS PROVIDING EXCLUDE COVER REMOVAL TO SIMPLIFY SELECTION AND/OR CONFLICT ADVICE

(76) Inventors: David L. Huelsman, 211 Cantwell Ct., Reynoldsburg, OH (US) 43068; Douglas M. Mair, 554 Timberlake Dr., Westerville, OH (US) 43061

( * ) Notice: Subject to any disclaimer, the term of this patent is extended or adjusted under 35 U.S.C. 154(b) by 372 days.

(21) Appl. No.: 11/527,637

(22) Filed: Sep. 27, 2006

(65) Prior Publication Data

US 2007/0094203 A1    Apr. 26, 2007

Related U.S. Application Data

(63) Continuation-in-part of application No. 10/950,815, filed on Sep. 28, 2004, now Pat. No. 7,552,102.

(60) Provisional application No. 60/721,089, filed on Sep. 28, 2005.

(51) Int. Cl.
*G06N 5/02* (2006.01)
(52) U.S. Cl. .............................. 706/47; 703/7
(58) Field of Classification Search .................. 706/47; 703/7
See application file for complete search history.

(56) References Cited

U.S. PATENT DOCUMENTS

| | | | |
|---|---|---|---|
| 5,212,771 A | 5/1993 | Gane et al. | |
| 5,301,284 A | 4/1994 | Estes et al. | |
| 5,311,424 A | 5/1994 | Mukherjee et al. | |
| 5,367,619 A | 11/1994 | Dipaolo | |
| 5,576,965 A | 11/1996 | Akasaka et al. | |
| 5,630,025 A | 5/1997 | Dolby et al. | |
| 5,701,400 A | 12/1997 | Amado | |
| 5,745,765 A | 4/1998 | Paseman | |

(Continued)

FOREIGN PATENT DOCUMENTS

WO        9948031        9/1999

(Continued)

OTHER PUBLICATIONS

Jacobi et al.; Generating Prime and Irredundant Covers for Binary Decision Diagrams; Design Automation, 1992, Proceedings 3rd European conference; Mar. 1992; pp. 104-108.

(Continued)

*Primary Examiner*—David R Vincent
*Assistant Examiner*—Mai T Tran
(74) *Attorney, Agent, or Firm*—Stolowitz Ford Cowger LLP

(57) ABSTRACT

An improvement in a computer-implemented rule processing method that provides conflict or selection advice to help guide a user achieve satisfiability of a business or engineering rule represented by a zero-suppressed binary decision diagram (ZDD) rule model. The improvement comprises obtaining at least one Exclude ZDD rule component from the ZDD rule model, identifying covers within the Exclude ZDD rule component, removing covers identified in the identifying step thereby to produce abridged Exclude ZDD rule component, determining satisfiability of the rule model utilizing the abridged Exclude ZDD component, and utilizing results of the determining step during automated decision support to help guide the user to attain satisfiability of the rule. An apparatus that implements the aforementioned method is also disclosed.

17 Claims, 11 Drawing Sheets

U.S. PATENT DOCUMENTS

| | | | |
|---|---|---|---|
| 5,805,462 | A | 9/1998 | Poirot et al. |
| 5,809,212 | A | 9/1998 | Shasha |
| 5,844,554 | A | 12/1998 | Geller et al. |
| 5,877,966 | A | 3/1999 | Morris et al. |
| 5,889,993 | A | 3/1999 | Kroeger |
| 5,910,898 | A | 6/1999 | Johannsen |
| 5,924,077 | A | 7/1999 | Beach et al. |
| 5,963,953 | A | 10/1999 | Cram et al. |
| 5,987,473 | A | 11/1999 | Jorgensen |
| 6,002,854 | A | 12/1999 | Lynch et al. |
| 6,016,394 | A | 1/2000 | Walker |
| 6,031,984 | A | 2/2000 | Walser |
| 6,035,305 | A | 3/2000 | Strevey et al. |
| 6,064,982 | A | 5/2000 | Puri |
| 6,076,080 | A | 6/2000 | Morscheck et al. |
| 6,163,876 | A | 12/2000 | Ashar |
| 6,182,275 | B1 | 1/2001 | Beelitz et al. |
| 6,256,618 | B1 | 7/2001 | Spooner et al. |
| 6,321,186 | B1 | 11/2001 | Yuan et al. |
| 6,327,581 | B1 | 12/2001 | Platt |
| 6,349,290 | B1 | 2/2002 | Horowitz |
| 6,385,617 | B1 | 5/2002 | Malik |
| 6,389,576 | B1 | 5/2002 | Lam et al. |
| 6,396,488 | B1 | 5/2002 | Simmons et al. |
| 6,424,962 | B1 | 7/2002 | Billon |
| 6,442,732 | B1 | 8/2002 | Abramovici et al. |
| 6,519,767 | B1 | 2/2003 | Carter et al. |
| 6,529,890 | B1 | 3/2003 | Pandit et al. |
| 6,535,883 | B1 | 3/2003 | Lee et al. |
| 6,556,978 | B1 | 4/2003 | Ginsberg et al. |
| 6,567,814 | B1 | 5/2003 | Bankier |
| 6,598,035 | B2 | 7/2003 | Branson et al. |
| 6,651,096 | B1 | 11/2003 | Gai et al. |
| 6,658,458 | B1 | 12/2003 | Gai et al. |
| 6,741,975 | B1 | 5/2004 | Nakisa et al. |
| 6,795,832 | B2 | 9/2004 | McGeorge et al. |
| 6,874,016 | B1 | 3/2005 | Gai et al. |
| 6,952,812 | B2 | 10/2005 | Abadir et al. |
| 6,961,913 | B1 | 11/2005 | Okazaki et al. |
| 6,983,187 | B2 | 1/2006 | Kern |
| 7,062,478 | B1 | 6/2006 | Huelsman et al. |
| 7,130,783 | B1 | 10/2006 | Harer et al. |
| 7,188,333 | B1 | 3/2007 | LaMotta et al. |
| 7,587,379 | B2 | 9/2009 | Huelsman et al. |
| 2001/0029499 | A1 | 10/2001 | Tuatini et al. |
| 2002/0065701 | A1 | 5/2002 | Kim et al. |
| 2002/0078431 | A1 | 6/2002 | Reps |
| 2002/0095645 | A1 | 7/2002 | Rodeh |
| 2002/0108093 | A1 | 8/2002 | Moondanos et al. |
| 2002/0112213 | A1 | 8/2002 | Abadir et al. |
| 2002/0165701 | A1 | 11/2002 | Lichtenberg et al. |
| 2002/0178432 | A1 | 11/2002 | Kim et al. |
| 2004/0138988 | A1* | 7/2004 | Munro et al. ............... 705/37 |
| 2004/0260667 | A1* | 12/2004 | Huelsman et al. ........... 706/47 |
| 2005/0080648 | A1 | 4/2005 | Huelsman |
| 2005/0108183 | A1* | 5/2005 | Huelsman et al. ........... 706/47 |
| 2007/0112767 | A1 | 5/2007 | Tilley |
| 2007/0159304 | A1 | 7/2007 | Agarwal et al. |
| 2007/0290791 | A1 | 12/2007 | Batra |

FOREIGN PATENT DOCUMENTS

| | | |
|---|---|---|
| WO | 03/081478 | 10/2003 |

OTHER PUBLICATIONS

Minato, Zero-Suppressed BDDs for Set Manipulation in Combinatorial Problems, Proceedings of the 30th Conference on Design Automation, Jul. 1993, pp. 272-277.

Cabodi, et al., Symbolic Traversals of Data Paths with Auxilary Variables, IEEE, 1994, pp. 93-96.

Panda, et al., Symmetry Detection and Dynamic Variable Ordering of Decision Diagrams, Proceedings of the 1994 IEEE/ACM International Conference on Computer-Aided Design, Nov. 1994, pp. 628-631.

Cosnard, et al., Automatic Task Graph Generation Techniques, Proceedings of the Twenty-Eighth Hawaii International Conference on System Sciences, Vo. 2, Jan. 3, 1995, pp. 113-122.

Bryant, Binary Decision Diagrams and Beyond, Enabling Technologies for Formal Verification, IEEE, 1995, pp. 236-243.

Minato, S., Representations of Discrete Funtions, Chapter 1, Graph-Based Representations of Discrete Functions, Sasao and Fujia, ed.s, 1996, Kluwer Academic Publishing, pp. 1-23.

Anderson, An Introduction to Binary Decision Diagrams, University of Denmark, Oct. 1997, pp. 8-11.

Cugola, G, et al., Exploiting an event-based infrastructure to develop complex distributed systems, Proceedings of the 20th International Conference on Software Engineering, Apr. 1998.

Gottlob, et al., The complexity of acyclic conjunctive queries, 39th Annual Symposium on Foundations of Computer Science Proceedings, Nov. 8, 1998, pp. 706-715.

Yang, Optimizing Model Checking Based on BDD Characterization,Thesis, Carnegie Mellon U.,May 1999, pp. 1-114.

Ejnioui, et al., Design Partitioning on Single-chip Emulations Systems, Thirteenth International Conference on VLSI Design, Jan. 3, 2000, pp. 234-239.

Kurihara, et al., BDD Encoding for Partial Order Constraints and its Application to Expert Systems in Software Verification Domains, 2000 IEEE International Conference on Systems, Man, Cybernetics, vol. 3, 8-11, Oct. 2000, pp. 2062-2067.

Beck, M., et al., Enabling Full Service Surrogates Using the Portable Channel Representation, Proceedings of the Tenth International Conference on World Wide Web, Apr. 2001, pp. 376-385.

Mishchenko, Alan. "An Introduction to Zero-Suppressed Binary Decision Diagrams" Jun. 8, 2001, Department of Electrical Engineering Portland State University. pp. 1-15.

"Array". Microsoft Computer Dictionary, Fifth Edition. May 1, 2002.

Aloul, F., M. Mneimneh, and K. Sakallah "ZBDD-Based Backtrack Search SAT Solver" International Workshop on Logic Synthesis (IWLS), New Orleans, Louisiana, pp. 131-136, 2002.

Moller, J., HR Andersen, H Hulgaard, "Product Configuration over the Internet presented at ",The 6th Informs Conference on Information Systems and Technology, Nov. 3-4, 2001, Miami Beach, Florida.

Moller, Jesper, "Configuration and E-commerce", IFORS Jul. 2002.

Minato, S., "Zero-Suppressed BDDs and Their Applications", International Journal on Software Tools for Technology Transfer, vol. 3, No. 2, pp. 156-170, Springer, May 2001.

USPTO; PCT/US2003/08265; International Search Report and Preliminary Examination Report; Aug. 13, 2003.

European Patent Office; PCT/US2007/079793; International Search Report and Written Opinion; Feb. 7, 2008.

European Patent Office; PCT/US2007/079797; International Search Report and Written Opinion; Feb. 7, 2008.

USPTO; File History U.S. Appl. No. 10/950,809 to Huelsman et al., filed Sep. 28, 2004; Part 1, Sep. 2004 through Dec. 2007.

USPTO; File History U.S. Appl. No. 10/950,809 to Huelsman et al., filed Sep. 28, 2004; Part 2, Mar. 2007 through May 2008.

USPTO; File History U.S. Appl. No. 10/950,809 to Huelsman et al., filed Sep. 28, 2004; Part 3, May 2008 through Aug. 2008.

USPTO; File History U.S. Appl. No. 10/950,809 to Huelsman et al., filed Sep. 28, 2004; Part 4, Aug. 2008 through Feb. 2009.

USPTO; File History U.S. Appl. No. 10/950,815 to Huelsman et al., filed Sep. 28, 2004; Part 1, Sep. 2004 through Feb. 2007.

USPTO; File History U.S. Appl. No. 10/950,815 to Huelsman et al., filed Sep. 28, 2004; Part 2, May 2007 through Feb. 2009.

USPTO; File History U.S. Appl. No. 10/950,622 to Huelsman et al., filed Sep. 28, 2004; Part 1, Sep. 2004 through Mar. 2007.

USPTO; File History U.S. Appl. No. 10/950,622 to Huelsman et al., filed Sep. 28, 2004; Part 2, Sep. 2007 through Dec. 2007.

USPTO; File History U.S. Appl. No. 10/950,622 to Huelsman et al., filed Sep. 28, 2004; Part 3, Apr. 2008 through May 2008.

USPTO; File History U.S. Appl. No. 10/950,622 to Huelsman et al., filed Sep. 28, 2004; Part 4, May 2008 through Aug. 2008.

USPTO; File History U.S. Appl. No. 10/950,622 to Huelsman et al., filed Sep. 28, 2004; Part 5, Aug. 2008 through Apr. 2009.
European Patent Office; PCT/US2007/079797; International Preliminary Report on Patentablility; Mar. 2009.
European Patent Office; PCT/US2007/079793; International Preliminary Report on Patentablility; Mar. 2009.
F. Somenzi; CUDD:CU Decision Diagram Package; http://vlsi.colorado.edu/~fabio/CUDD/nodel.html, site visited Jun. 11, 2009.

USPTO; File History U.S. Appl. No. 10/950,622 to Huelsman et al., filed Sep. 28, 2004; Aug. 2009.
USPTO; File History U.S. Appl. No. 10/950,815 to Huelsman et al., filed Sep. 28, 2004; Aug. 2009.
USPTO; File History U.S. Appl. No. 10/950,809 to Huelsman et al., filed Sep. 28, 2004; Aug. 2009.

* cited by examiner

| 1 ⇒ 2 | 2 ⇒ 3,4 | 3 ⇒ 2,4 | 4 ⇒ 2,3,7 | 5 ⇒ 6,8 |
| 6 ⇒ 5 | 7 ⇒ 4 | 8 ⇒ 5 | 9 ⇒ 10 | 10 ⇒ 9 |

Fig. 9

| Attributes | Closure 1 | Closure 2 | Closure 3 |
|---|---|---|---|
| | 1, 2, 3, 4, 7 | 5, 6, 8 | 9, 10 |

Fig. 10

RULE PROCESSING METHOD AND APPARATUS PROVIDING EXCLUDE COVER REMOVAL TO SIMPLIFY SELECTION AND/OR CONFLICT ADVICE

CROSS-REFERENCE TO RELATED PATENTS AND PATENT APPLICATIONS

This invention claims the benefit of U.S. Provisional Application No. 60/721,089 filed Sep. 28, 2005 in the name of the same inventors thereof.

This invention concerns improvements to inventions disclosed in commonly-owned, U.S. application Ser. No. 10/101,151 filed Mar. 20, 2002 (now U.S. Pat. No. 6,965,887) and Ser. No. 10/101,154 filed Mar. 20, 2002, both of which are incorporated herein.

The present application is also a continuation-in-part and claims priority to commonly-owned, copending U.S. Pat. application Ser. No. 10/950,815, filed Sep. 28, 2004, now U.S. Pat. No. 7,552,102, entitled "Rule processing method, apparatus, and computer-readable medium to provide improved selection advice," which is incorporated herein.

BACKGROUND

This invention relates to a rule processing system or method that provides automated decision support, but more specifically, to an improvement utilized during decision automation to provide more succinct conflict and selection advice.

During automated rule-based processing, a user may input one or more selections of rule parameters to achieve satisfiability of a rule. Generically, user selections may take the form of enumeration values of rule attributes the relationships among which define the rule. In a product configuration rule for a desktop computer system, for example, an attribute may comprise a computer bundle type and selectable enumerations of that attribute may comprise multimedia, power PC, business workstation, or entry level. Depending on an initial selection of bundle type, enumerations of other product attributes (e.g., CPU speed, DVD speed, Hard Drive Capacity, RAM memory size, etc.) may or may not be compatible.

In order to lessen the amount of effort required of the user to determine and select other compatible enumerations for other attributes, it is desirable to automatically indicate to the user of further compatible selections of enumerations based on the user's initial selections, i.e., to automatically identify or suggest further inputs that satisfy the product configuration rule according to the user's manually-supplied inputs. This requires identification of enumerations that are valid with each other and also valid with the user's initial selections. Such advice more quickly guides the user in choosing correct enumerations for all attributes of the overall rule being processed. Automatic identification/selection of further compatible enumerations is also desirable for other types of business or engineering rule processing system or method.

Thus, this invention is an improvement to the invention disclosed in commonly-owned, incorporated U.S. application Ser. No. 10/101,151 filed Mar. 20, 2002 relating to various rule processing methods, e.g. zero-suppressed binary decision diagrams (ZDDs). The '151 disclosure describes how to generate and combine sets of rules and then to assess satisfiability of those rules as applied to a business or engineering problem.

The related disclosures of U.S. application Ser. No. 10/101,151 filed (now U.S. Pat. No. 6,965,887) and Ser. No. 10/101,154 also show that a ZDD rule representation may be divided into at least two distinct components, i.e., an Include ZDD component and an Exclude ZDD component. This invention deals with improvements to the Exclude ZDD component.

The Include ZDDs contain sets of combinations (e.g., rule components) that are valid together while the Exclude ZDDs contain sets of combinations that can never be valid together. The results from both ZDDs are processed simultaneously to determine the validity of the overall rule represented by the individual Include and Exclude ZDDs. The improvements herein, however, do not necessarily change the underlying validity determination system or method of the aforementioned related disclosures.

The related disclosures also show how to create selection and/or conflict advice based on a set of initial enumerations selected by a user. Such advice is extracted from the Include and the Exclude ZDD representations, as well as an attribute relations ZDD of the rule, to help guide the user in selecting valid combinations of attributes and compatible enumerations for such attributes of the overall rule.

To obtain advice from the Include ZDD rule component, each attribute is considered individually. The processor inspects each attribute in relation to other attributes to determine how potential user selections of enumerations affect the advice for that attribute.

Exclude advice, on the other hand, is generated for all of the attributes at the same time because they indicate enumeration selections that can never be valid together. All of the Exclude enumeration selections are used to find the excluded combinations. Then, the processor calls a ReduceX function to pare down those combinations to the ones that can be excluded on a next user selection.

Lastly, advice from the Include ZDD is compared with the advice from Exclude ZDD. The Include advice identifies which enumerations can be included. The Exclude advice removes some of those Included enumerations.

The present invention also provides an enhancement to commonly-owned incorporated U.S. patent application Ser. No. 10/950,815, filed Sep. 28, 2004, now U.S. Pat. No. 7,552,102, entitled "Rule processing method, apparatus, and computer-readable medium to provide improved selection advice." The '815 disclosure, among other things, shows how to remove cover details from an Exclude ZDD but the techniques disclosed therein did not effect removal of cover details in all cases. The extent to which the '815 method or the apparatus implementing the same fails to remove cover details, however, was dependent on the particulars of the specific Exclude ZDDs being inspected. Additionally, techniques shown in the '815 disclosure did not necessarily remove all cover details in more than the most trivial of circumstances. The present invention, on the other hand, provides a method (and apparatus implementing the same) that removes cover details across a full range of circumstances.

BRIEF DESCRIPTION OF THE DRAWINGS

FIG. 9 shows which attributes are related to each other in a hypothetical rule model in order to illustrate ZDD reduction techniques using transitive closure to simply manipulations and reduce ZDD growth.

FIG. 10 illustrates three closures based on the attribute relationship shown in FIG. 9.

SUMMARY

Figures 1, 2, 3:
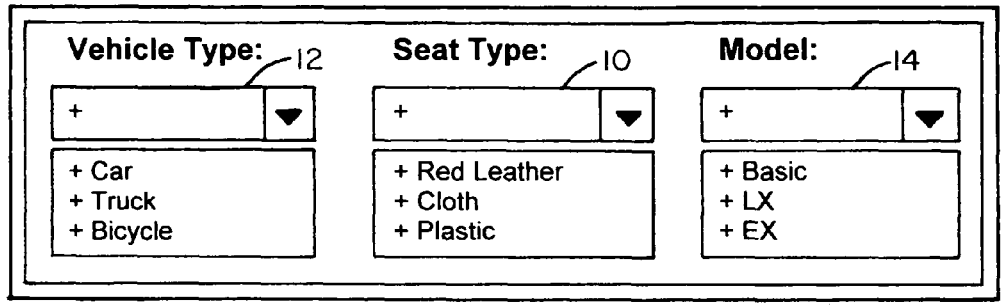
FIG. 1 is a graphical user interface (GUI) or screen print depicting an exemplary product configuration rule involving selecting a type of seat for a vehicle and model specification.
FIG. 2 is a matrix representation of a first rule statement relative to choices shown in FIG. 1, which representation has two dimensions denoted by one horizontal row and one vertical column that interrelate two attributes, i.e., vehicle type and seat type.
FIG. 3 is a matrix representation of a second rule statement relative to choices shown in FIG. 1, which representation has three dimensions that interrelate three attributes, i.e., vehicle type, seat type, and model.

In accordance with the present invention, there is provided an improvement in a computer-implemented rule processing method that provides conflict or selection advice to help guide a user achieve satisfiability of a business or engineering rule represented by a zero-suppressed binary decision diagram (ZDD) rule model. The improvement comprises obtaining at least one Exclude ZDD rule component from the ZDD rule model, identifying covers within the Exclude ZDD rule component, removing covers identified in the identifying step thereby to produce an abridged Exclude ZDD rule component, determining satisfiability of the rule model utilizing the abridged Exclude ZDD component, and utilizing results of the determining step during automated decision support to help guide the user to attain satisfiability of the rule. Another aspect of the method includes utilizing the abridged Exclude ZDD rule component in a rule processing method to provide conflict and/or selection advice to the user.

A further aspect of the invention includes, in the removing step, expanding nodes in the Exclude ZDD to include all attributes specified in the business or engineering rule, marking nodes associated with covers in the Exclude ZDD, and removing covers and marked nodes from the Exclude ZDD thereby to produce the abridged Exclude ZDD. Other aspects of the invention include NOR'ing the abridged Exclude ZDD with an Include ZDD of the overall business or engineering rule thereby to generate overall results for conflict and selection advice. The expanding step may be performed by renumbering nodes to provide insertion of marker nodes within an index sequence of initial nodes of the Exclude ZDD component. Cover removal operations may be carried out by separately performing removal operations on individual transitive closure sets of Exclude ZDD components and then combining the results of respective removal operations to produce the abridged Exclude ZDD.

The step of removing covers and marked nodes may include reordering nodes of the ZDD so that marker node groups appear at the bottom of the ZDD, removing nodes that point to same node as the marker node, removing marker nodes that point to the "one" node, and then reordering nodes of the ZDD back to initial index sequence.

In another aspect of the invention, there is provided an apparatus for use in a computer-implemented rule processing apparatus that provides conflict or selection advice to help guide a user achieve satisfiability of a business or engineering rule represented by a zero-suppressed binary decision diagram (ZDD) rule model. The apparatus is an improvement comprising a cover removal module to remove covers in the ZDD rule model wherein the module includes program instructions to effect in the processing apparatus the identification of covers within the Exclude ZDD rule component, the removal of covers so identified thereby to produce an abridged Exclude ZDD rule component, the determination of satisfiability of the rule model utilizing the abridged Exclude ZDD component, and the utilization of results of the determination during automated decision support to help guide the user to achieve satisfiability of the rule.

Other aspects of the improvement apparatus include a module including programming instructions to carry out the steps of the aforementioned methods.

In a further embodiment of the invention, there is provided an improvement in a computer-implemented rule processing system that determines for a user satisfiability of a ZDD rule model indicative of a business or engineering rule. The improvement comprises a first program module to obtain at least one Exclude ZDD rule component from the ZDD rule model, a second program module to identify and remove cover details within the Exclude ZDD rule component whereby to produce an abridged Exclude ZDD rule component, and an execution engine to determine satisfiability of the ZDD rule model utilizing the abridged Exclude ZDD rule component to provide results of satisfiability to a user.

In yet another embodiment of the invention there is provided a computer-implemented method for use in a computer-implemented rule processing system to provide a determination of satisfiability of a business rule represented by a ZDD rule model. The computer-implemented method serves to reduce the complexity of determining satisfiability by obtaining an Exclude ZDD representation of the rule model, removing at least one cover from said Exclude ZDD representation thereby to generate an abridged Exclude ZDD representation, and providing results to the determination to a user utilizing the abridged Exclude ZDD representation.

Other aspect, features, and embodiments of the invention will become apparent upon review of following description taken in connection with the accompanying drawings.

DESCRIPTION OF ILLUSTRATIVE EMBODIMENTS

Removing covers from the Exclude ZDD rule component enables a rule processing system or method to provide more succinct advice to a user due to elimination of superfluous information that tends to obscure the advice. Superfluous information is contained in covers or cover details, which is generally defined as redundant information in a rule the exclusion of which has no bearing on determining satisfiability of the rule or a component thereof. According to a definition provided by NIST (National Institute of Science and Technology), a set cover (e.g., cover) is a set of sets whose union has all member of the union of all sets, and the set cover problem is to find a minimum size set that represents the rule to be processed. See, http://www.nist.gov/dads/HTML/set-cover.html. See also, http://www.cs.sunysb.edu/~algorith/files/set-cover.shtml.

Examples described herein show how information in Exclude ZDD rule components can be obscured by cover details when, for example, rule satisfaction involves choosing an allowable seat type for a vehicle. FIG. 1 is a graphical user interface or screen print showing such a rule. As described below, the present invention eliminates at least part and preferably all needless and superfluous information in the Exclude rules to enable a more direct resolution of rule satisfiability. As noted in the related disclosures, the overall rule to be processed is broken down, in part, into Include and Exclude rule components. This invention deals with further processing the Exclude rule component to eliminate redundant information therein.

The product configuration rule of FIG. 1 concerns selection of a material enumeration within a seat type attribute 10 for a vehicle. In this example, possible user selections (indicated by a "+" sign next to the specific enumerations) for the material enumeration of the seat type attribute 10 are red leather, cloth, or plastic. Vehicle type attribute 12 includes three enumerations: car, truck, and bicycle. Model attribute 14 includes three enumerations: basic, LX and ES. The following rule conditions (i.e., components) of an Exclude ZDD are specified by the following two statements:

(1) Red leather seats cannot be used in any car.
(2) Red leather seats cannot be used in car models LX, EX, or BASIC.

Since the entire set of model enumerations is specified in statement (2) both rules if included in a ZDD rule representation are deemed identical. Thus, statement (2) could be simplified to statement (1) without loss of any meaning.

Statement (1), however, only considers the enumerations of two attributes (Vehicle type 12 and Seat Type 10) whereas statement (2) considers the enumerations of all three attributes 10, 12, and 14. FIG. 2 represents statement (1) as a rule component that has two dimensions. The only selection (matrix entry 17), e.g., intersection of row 16 and column 18, in the rule representation would be at Car for the vehicle type attribute and Red Leather for the seat type attribute. FIG. 3 represents the rule component for statement (2), which has three dimensions that interrelate vehicle, seat, and model types. One dimension is reflected in the vertical column for seat type (leather, cloth, or plastic) while two dimensions are reflected in the horizontal rows; i.e., 22, 24, and 26 representing car, truck, and bicycle as a one dimension and a model designation for each vehicle type as a second dimension. The three-dimensional rule of FIG. 3 contains three entries, 30, 32, and 34 to represent the Exclude relationships between "red leather" and each of the car models in the vehicle type attribute.

As evident from the rule representations of FIGS. 2 and 3, like the two statements from which they were derived, they have the same meaning and should have the same effect in the overall advice provided to the user. As described in the commonly-owned '815 application, incorrect or incomplete advice may be preliminarily indicated as to whether or not Red Leather seats are OK to put into a car.

When the user selects "car" in vehicle type attribute 12 (FIG. 1), it is immediately known that red leather seats are incompatible because statements (1) and (2) render the selection incompatible with any of the car models. But, with the cover details residing in the Exclude ZDD, it is not known that red leather seats are incompatible until either an enumeration in car model attribute 14 is selected by the user or the red leather enumeration in the seat type attribute 14 is selected by the user. Thus, the superfluous information about car models cloud resolution of the issue.

Figure 4:
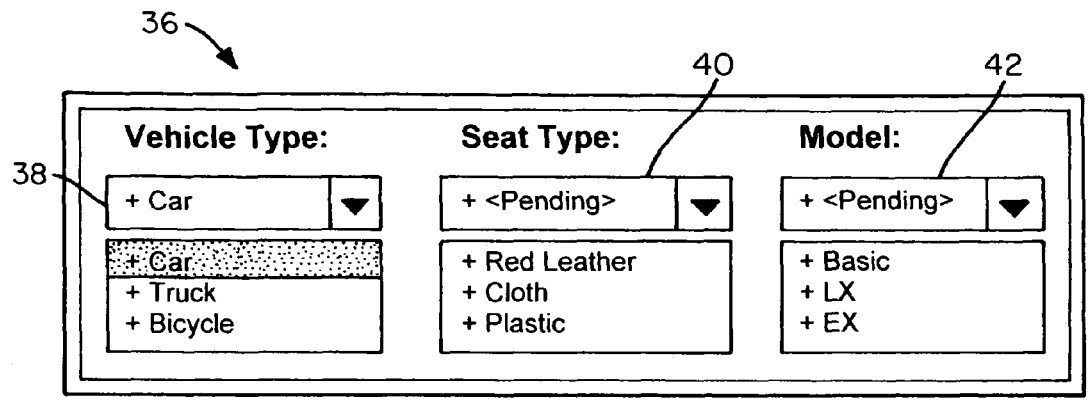
FIG. 4 is graphical user interface using the FIG. 2 rule representation to generate choices when the user selects the "car" enumeration in a vehicle type attribute. Further possible choices of enumerations (i.e., selection and conflict advice) are shown for the seat type and model type attributes.

A decision automation system or method as described in the commonly-owned '151 or '154 disclosures would display correct advice to a user when using the rule for statement (1) as shown in the graphical user interface 36 of FIG. 4, which shows user selection of the car enumeration in vehicle type attribute 38. Note the "−" symbol immediately appears in front of red leather enumeration of seat type attribute 40 when the vehicle type of car is selected by the user. As indicated, user selection of an enumeration in attributes 40 and 42 remain "pending."

Figure 5:
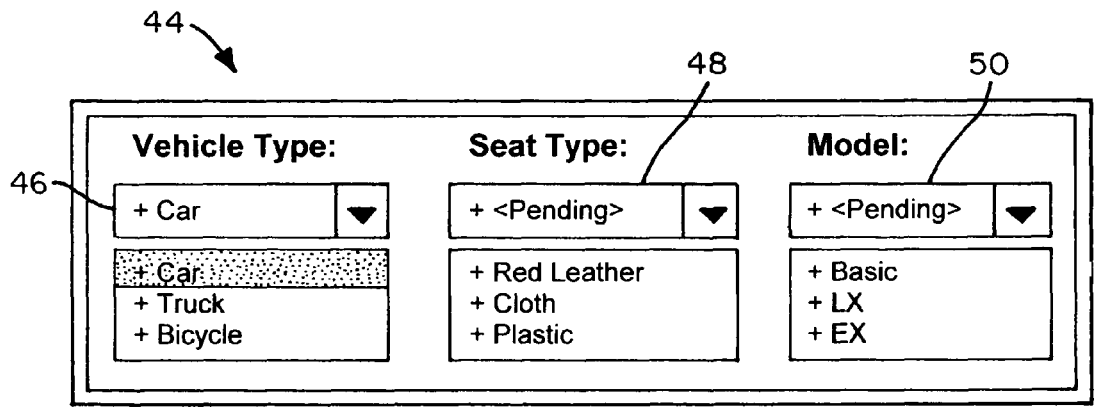
FIG. 5 is graphical user interface using the FIG. 3 rule representation to generate choices when the user selects the "car" enumeration in a vehicle type attribute. Further possible choices of enumerations (i.e., selection and conflict advice) for the seat type and model type attributes, which advice is preliminarily incorrect until making further user selections in the pending seat type and model type attributes.

A decision automation system or method constructed as described in the '151 or '154 disclosures will display incorrect advice, as shown in GUI 44 of FIG. 5, when using the rule for statement (2). Here, a "+" symbol appears in front of Red Leather enumeration of attribute 48 when car is selected for vehicle type attribute 46. The "+" symbol in front of the enumeration indicates a permissible selection within "pending" attributes 48 and 50.

Incomplete or incorrect advice is preliminarily indicated to the user because the Exclude ZDD for the rule component of statement (2) contains superfluous cover details. Cover details in the Exclude ZDD confuse the ReduceX routine described in the related disclosures. As aspect of the present invention removes this ambiguity.

Figure 6:
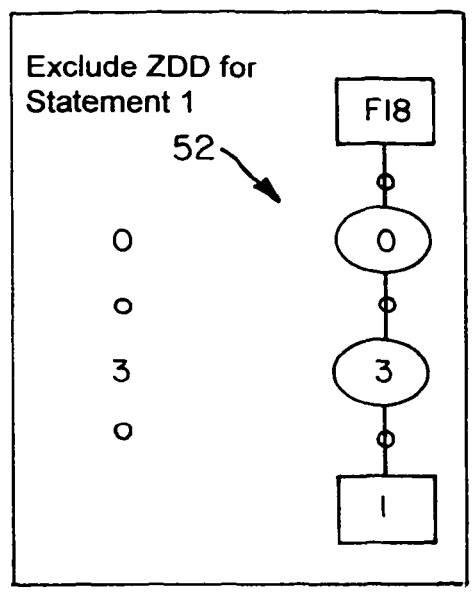
FIG. 6 shows an Exclude ZDD representation of the first rule statement indicated by the matrix representation of FIG. 2.
Figure 7:
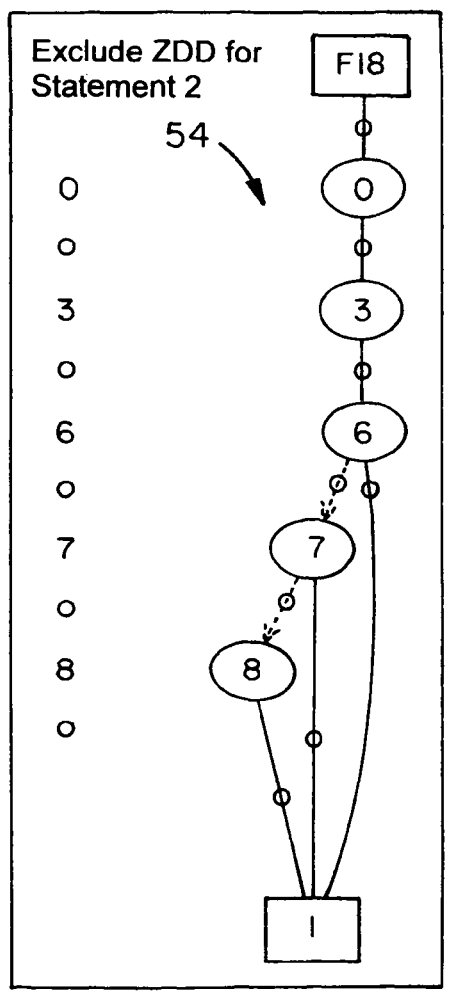
FIG. 7 shows an Exclude ZDD representation for the second rule statement indicated by the matrix representation of FIG. 3.

To explain further, FIG. 6 shows an Exclude ZDD 52 for statement (1) and FIG. 7 shows an Exclude ZDD 54 for statement (2). Since the two rules have the same meaning, the Exclude ZDD representing the rules should be the same, but they are not. Cover details in the Exclude ZDD 54 of FIG. 7 are removed so that ZDDs 52 and 54 provide matching results.

Genesis of Cover Details

The '815 disclosure describes how cover details may be introduced into an overall rule model. Two ways are shown. Cover details may be created as shown above where superfluous information is embraced by respective rule components, or they can be created by unintended or in much less obvious ways. In the example above, superfluous cover detail information was purposely introduced for purposes of illustration, but often, this type of information is inadvertently introduced by the rule modeler during the rule definition or rule entry process.

It is also possible to inadvertently introduce cover details by defining triangular Exclude rules. A triangular Exclude rule comprises three rules, all of which have two dimensions.

Such condition may exist in a situation where rule (1) concerns attributes A and B, rule (2) concerns attributes B and C, and rule (3) concerns attributes C and A. The composite representation of the triangular rules has three legs like a triangle that cycle back upon itself. The notion of triangular Exclude rules may also be generalized for larger rule cycles, e.g., quadrangular rules, and so on.

A computer-implemented routine removes cover details created by rule cycles and also removes cover details introduced by user "in-clicking" of superfluous information when creating a rule model. The improved method or apparatus of the present invention does not differentiate between the types of cover details being removed because, advantageously; all types of covers are removed.

A principal aspect of this invention provides a functional replacement for the exclude cover detail removal method described in the '815 application since it removes additional cover details. Relative to the Exclude ZDD, the method embodiment employed herein performs the steps of: (1) expanding terms, e.g., expanding every term as it is added to the Exclude ZDD (the expansions are marked for later removal); (2) marking terms, e.g., marking all paths involved in covers, and (3) removing terms, e.g., removing the covers and markers from the Exclude ZDD.

Markers show paths in the Exclude ZDD that were previously covered for any given attribute. In the '815 disclosure, as cover details were removed, parts of other cover details could also be removed. Remaining cover details, however, were much harder to find.

By using a marking procedure described herein, most if not all of the cover details may be found and removed. Removing some parts of the cover details, however, does not remove the marker node. The presence of a marker node on a path, though, suggests that at one point that the attribute was completely covered on this path, but that it is still covered on this path. Marking provides a way to identify and later remove marked nodes.

Building Exclude ZDDs by Expanding Terms

Building the Exclude ZDD involves adding in all of the individual terms that were selected by the rule editor/modeler during rule definition. The addition of these terms may create cover details that should be removed. So, the term is expanded to include fully marked covers having related attributes but no enumerations in the term. Only the attributes in the transitive closure are used. Once the term is properly expanded, it is added to the Exclude ZDD.

The illustrated example of FIG. 1 has three attributes, and each attribute has three enumerations. There is one single dimensional rule and one two-dimensional rule with a total of seven possible user selections. The result of all of these selections is that the attribute containing node "0," i.e., which contains "car," is totally covered. That means that enumeration "0" is always excluded and must be on a path all by itself in the Exclude ZDD.

In order to provide space for the marker nodes within the node index sequence of the Exclude ZDD, nodes are temporarily renumbered. For each node index, the initial index value is doubled and one is added. So, node 0 becomes node 1, and node 1 becomes 3, and node 3 becomes 7, and so on. Thus, the renumbering algorithm assigns odd numbers to the initial index values of the nodes. Inserted marker nodes, however, have even index numbers. Later, after all of the maker nodes are removed, the renumbering algorithm is reversed so that the nodes reacquire their original index position within the ZDD.

The first step in building the Exclude ZDD is to add terms to it. This procedure is described in the '151 and '154 applications, incorporated herein. The difference here is that now, each ZDD term must be expanded as it is built. Every attribute in the closure must be represented in each term. The attribute will either have an enumeration, or a marked cover, in the term.

Figure 8:
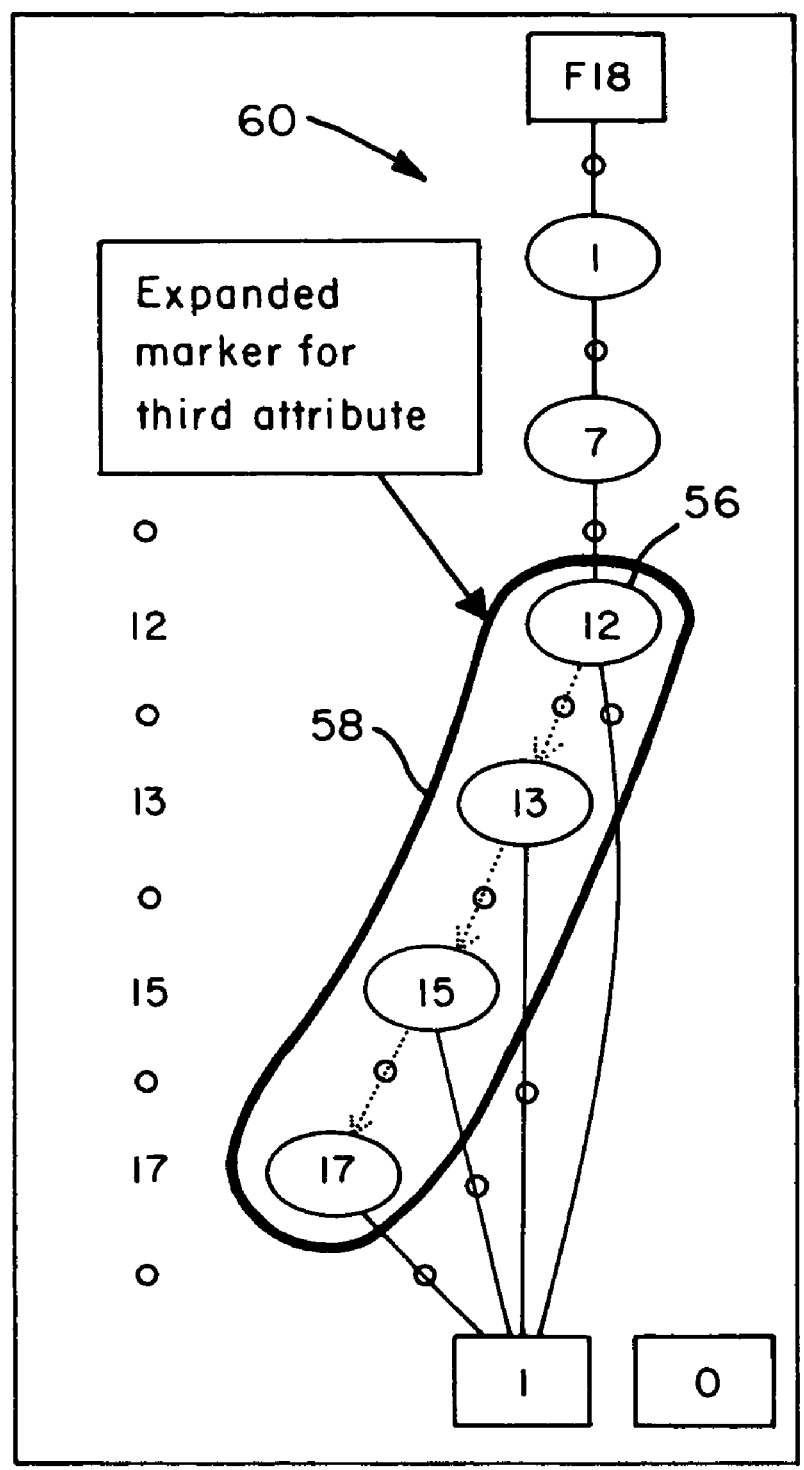
FIG. 8 illustrates, according to an aspect of the invention, expanding nodes of a ZDD to reflect all attributes of a term being created with nodes 1 and 7, which takes into account the first two attributes, i.e., vehicle type and seat type.

FIG. 8 shows a ZDD term for the Exclude ZDD 52 of FIG. 6 being created with nodes 1 and 7, which takes into account the first two attributes of the rule, i.e., vehicle type and seat type. As shown, the index levels of the nodes are renumbered according to the above process. A node for the third attribute, i.e., model, is added to ZDD term 60 because it is related to the other attributes. So a marker node 56 (Index 12) is added, followed by the XOR for the third attribute on the else leg of the marker node. This expanded ZDD term 60 is then OR'ed into the overall Exclude ZDD that will later be used to produce conflict and selection advice for the user.

Calculating Closures for Exclude Attributes

During the step of expanding terms, an Exclude ZDD of a particular business or engineering rule may grow unduly large due to expansion of terms for all possible combinations, i.e., the terms are OR'ed with the other exclude terms causing the ZDD to grow quickly.

Using a series of program instructions in accordance with another aspect of this invention, the algorithm used herein advantageously limits the growth of the expanded Exclude ZDD by expanding the term by only using attributes that are interrelated with each other. Determining the transitive closure for all attributes involved in Exclude rules identifies which sets of attributes are interrelated.

An implementation of the Dijkstra algorithm from "Mathematical Structures for Computer Science, Forth Edition, by Judith Gerstling," for example, may be used to calculate the transitive closures.

Example

Calculating Transitive Closures

Considering, for example, a model having five rules where the first rule concerns attributes 1 and 2; the second rule concerns attributes 2, 3 and 4; the third rule concerns attributes 4 and 7; the forth rule concerns attributes 5, 6, 8; and the fifth rule concerns attributes 9 and 10. Using this information the table of FIG. 9 is constructed, which identifies the attributes related to each other. Using these relationships, the three closures set forth in FIG. 10 are created. Anytime a term is built using attribute 5, for example, attributes 6 and 8 are also included. Likewise, attributes 9 and 10 are always used together, and attributes 1, 2, 3, 4 and 7 are used together.

Using transitive closures emulates splitting up a single Exclude ZDD into several separate Exclude ZDDs that are independent of each other. The ZDD components all reside in the same Exclude ZDD but they may be independently processed since neither will have an impact on the deterministic output (i.e., advice) provided by the other. The ZDD components of the closure sets also grow independently of each other, which leads to dramatic size reduction of the overall rule.

The product configuration example of FIG. 1 has only one transitive closure and therefore all of the attributes are interrelated and reside in every expanded term, but other business or engineering rules may have many transitive closures.

Expanding Terms in the Exclude ZDD

Figure 11:
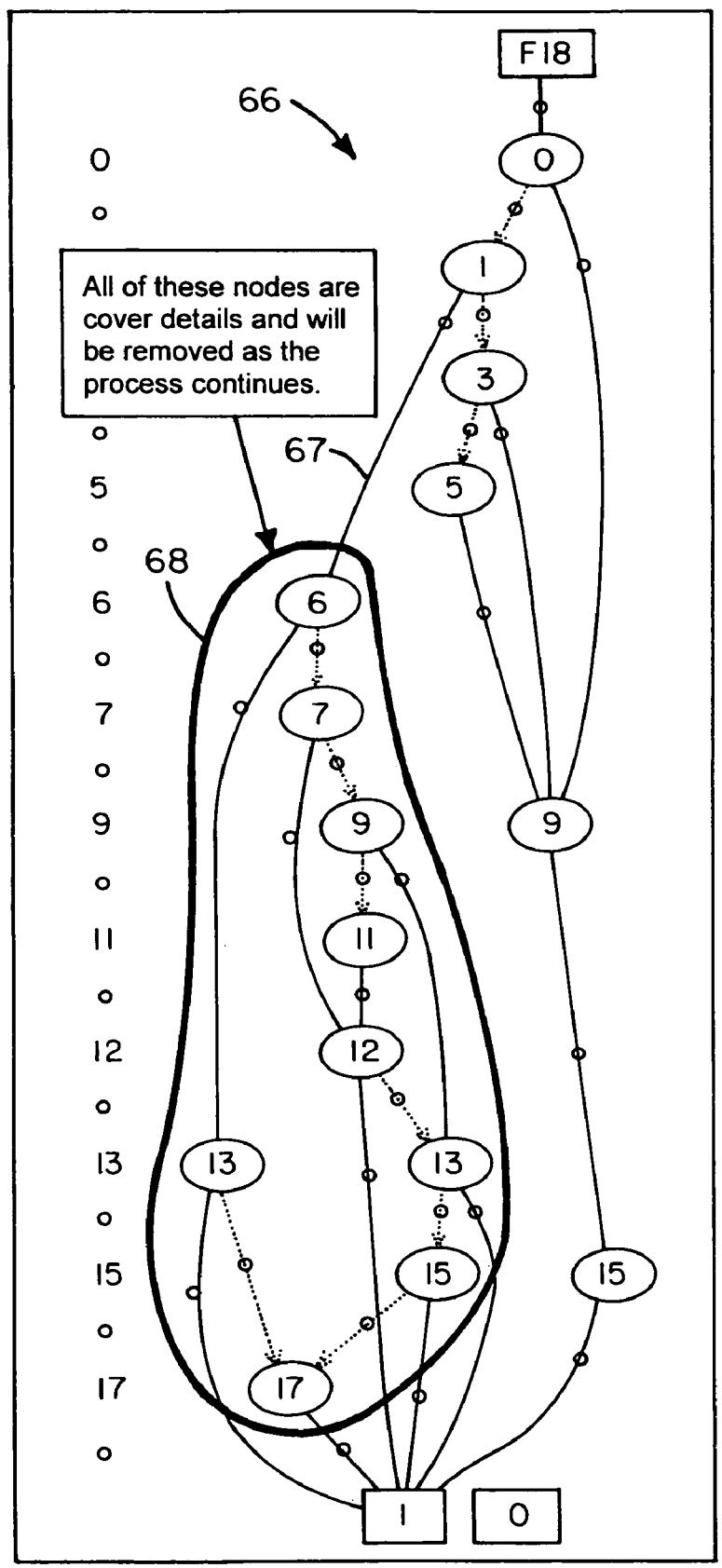
FIG. 11 shows an Exclude ZDD having expanded terms OR'ed into it according to an aspect of the present invention.

FIG. 11 shows an Exclude ZDD 66 with expanded terms OR'ed together. In this example, nodes with even index numbers are the marker nodes. The marker nodes preferably have the smallest index for the attribute. As stated above, Exclude ZDD 66 was created with seven individual terms.

In the Exclude ZDD of FIG. 11, node 1 has a rather large function 68 on its THEN leg 67. Function 68 turns out to be a cover detail that is subsequently removed.

Marking Paths in the Exclude ZDD Denoting Attribute Covers:

In order to find the "covered" attribute, the Exclude ZDD 66 is reordered to move nodes representing the entire attribute group to the bottom of the ZDD. This is also shown in the '815 application but the difference here is that covers are not removed. Instead, marker nodes are added to the cover. Removal of the cover details occurs later. Then, a routine is provided that moves the next group of attribute nodes to the bottom of the Exclude ZDD and marks the cover. This process is repeated for other attribute groups.

Figure 12:
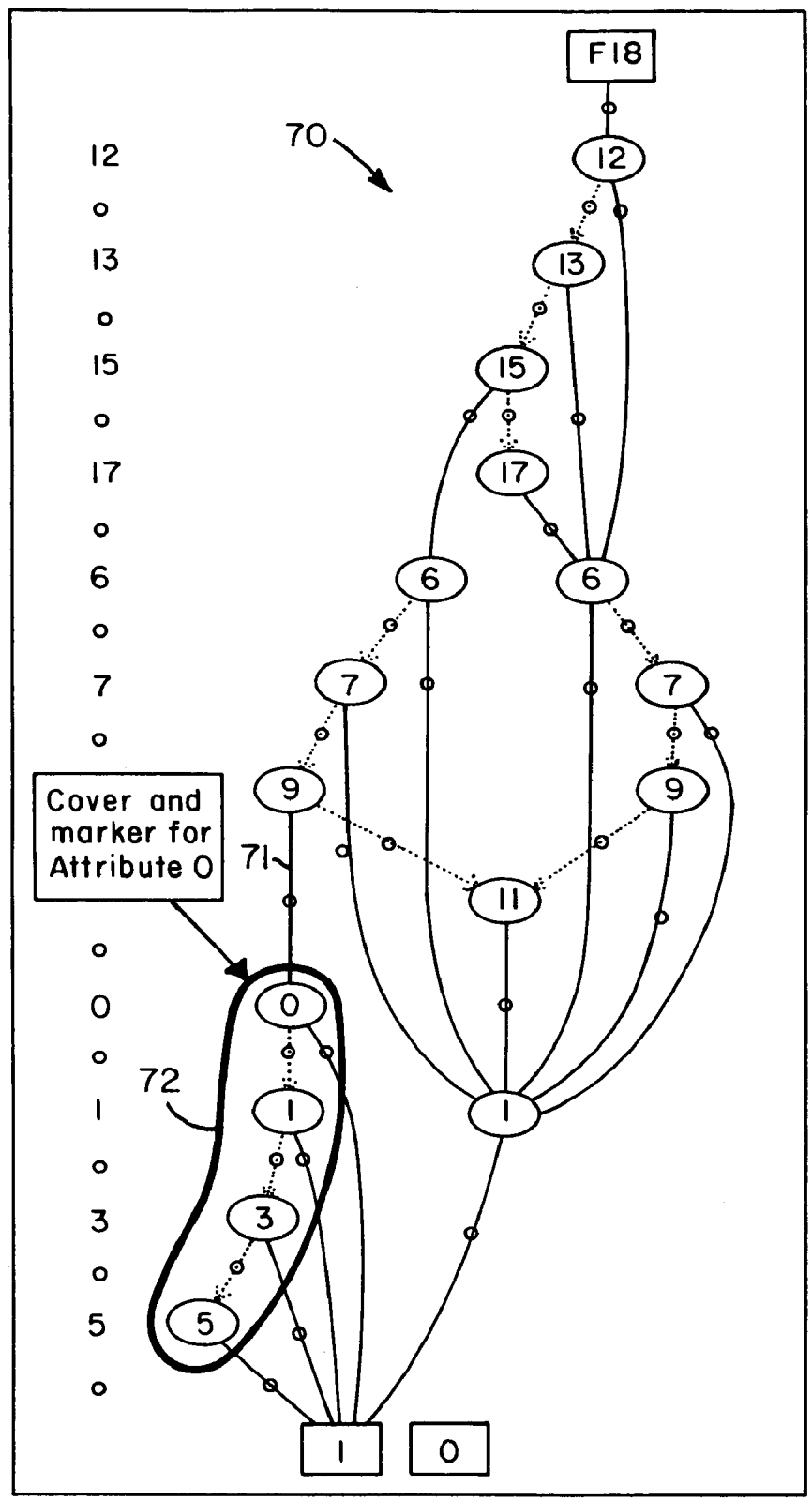
FIG. 12 shows an Exclude ZDD identifying a cover detail that is subsequently removed from the ZDD.

FIG. 12 shows an Exclude ZDD 70 having cover 72 containing a marker node zero. The marker node zero was added for attribute zero because the edge 71 from node 9 of ZDD 70 has a complete cover through attribute zero. The cover is unchanged but the marker node (node "0") was added just before the cover.

Removing Marked Cover Details

Figure 13:
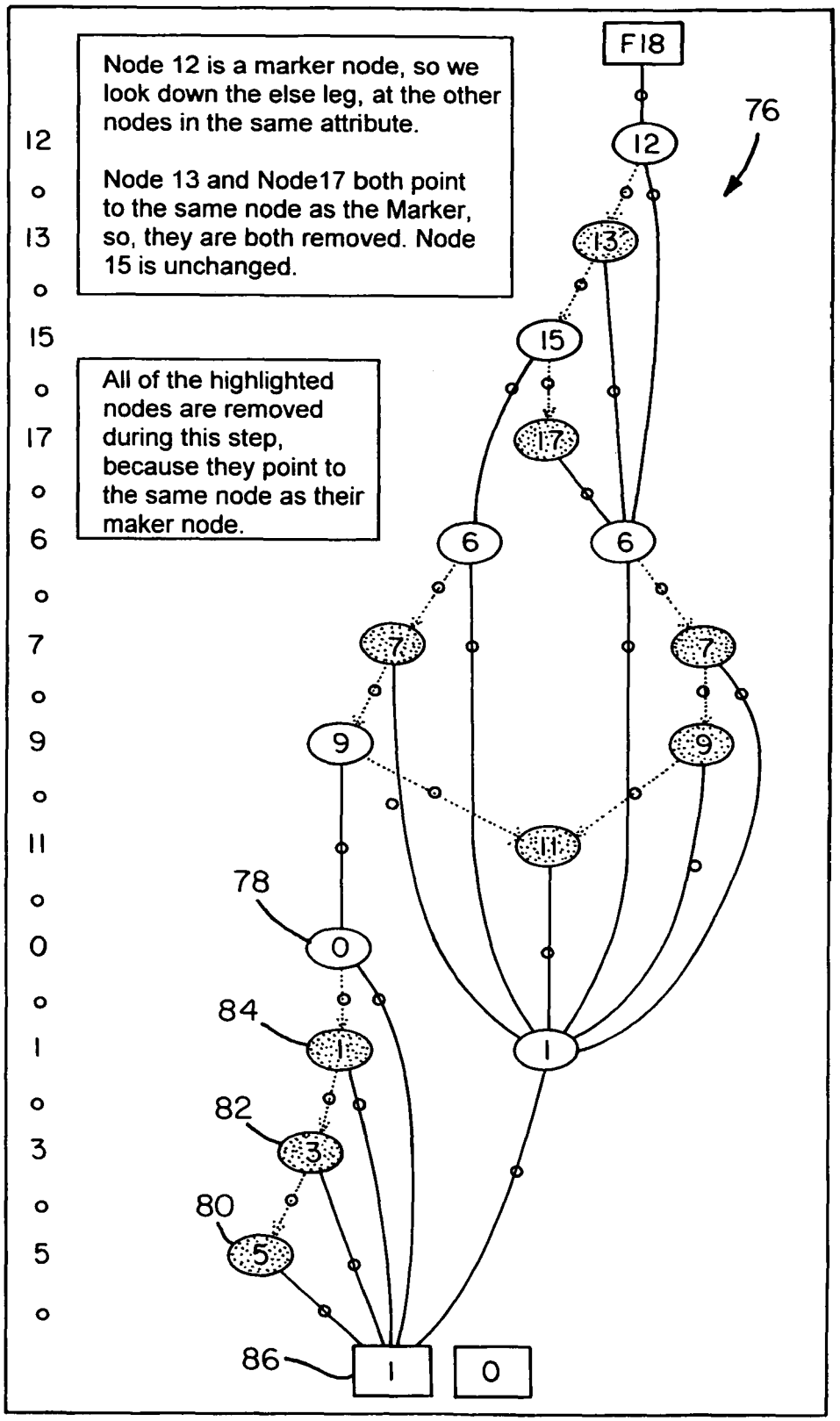
FIG. 13 illustrates a procedure of removing nodes from an Exclude ZDD according to an aspect of the present invention.

Removal of marked cover details is performed on the Exclude ZDD 70 and does not require reordering the attributes. A new ZDD with covers removed is built from bottom up, as illustrated in FIG. 13. In FIG. 13, the "blackened" nodes are slated for removal. Moving from bottom up, whenever a marker node is encountered, e.g., marker node 78, the system (or method) effects an examination of all of the nodes 80, 82, and 84 of a common attribute on the ELSE leg. If a node on the ELSE leg points to the same node 86 as the marker node 78, the node is removed. In the illustrated example, nodes 80, 82, and 84 point to the "1" node 86 and are thus removed. This procedure is repeated for other marker nodes in ZDD 76. The resulting ZDD 88 is shown in FIG. 14.

Exclude ZDD with Cover Details Removed

Figure 14:
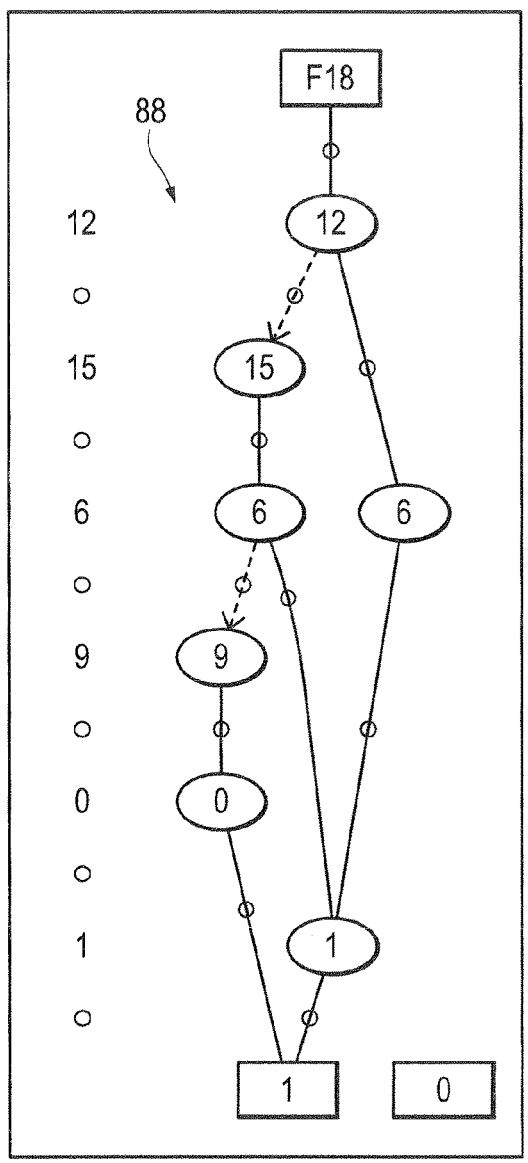
FIG. 14 shows a resulting ZDD after nodes have been removed.

In the previous step, cover details were removed from the Exclude ZDD 76, but the marker nodes still remain in the resulting ZDD 88 of FIG. 14. The resulting ZDD 88 is much smaller, as expected, because the system removed much of the information that was initially expanded out during the term expansion procedure. The procedure employed also successfully removed cover details introduced during rule building.

The ZDD tree 88 now contains a much smaller function but still contains the maker nodes. The marker nodes are the nodes with index numbers 0, 6 and 12 in ZDD 88. The next step in the process is to remove the marker nodes.

Removing Marker Nodes

In order to remove the marker nodes, nodes for respective attribute groups are moved to the bottom of the ZDD, one by one. With the attribute group of nodes located at the bottom of the ZDD, the marker node can be removed efficiently.

Any node that points to the marker node for the attribute at the bottom of the ZDD can point directly to the constant "1" node instead. The system rebuilds the ZDD by removing the marker node as it builds the ZDD from the bottom up.

Figure 15:
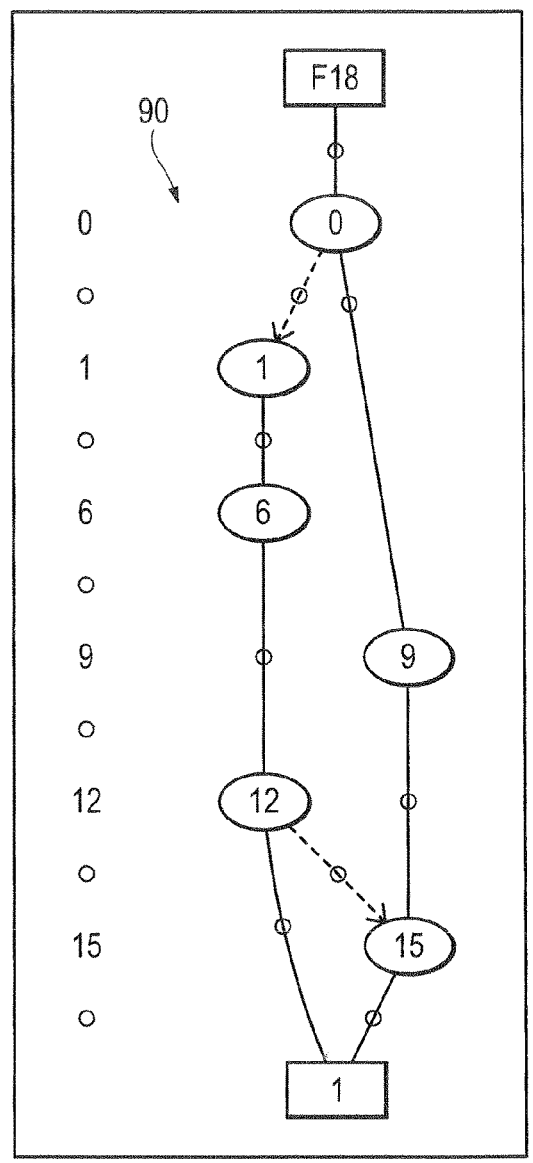
FIG. 15 shows the ZDD of FIG. 14 with an attribute group of nodes moved to the bottom of the ZDD to facilitate removal of marker nodes.
Figure 16:
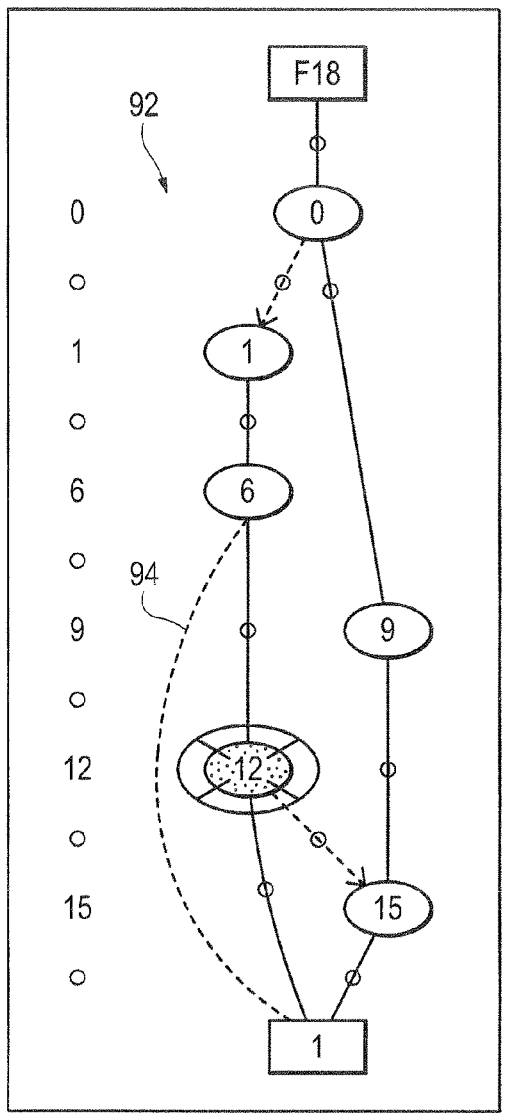
FIG. 16 illustrates rebuilding a ZDD by removing marker nodes therein.
Figure 17:
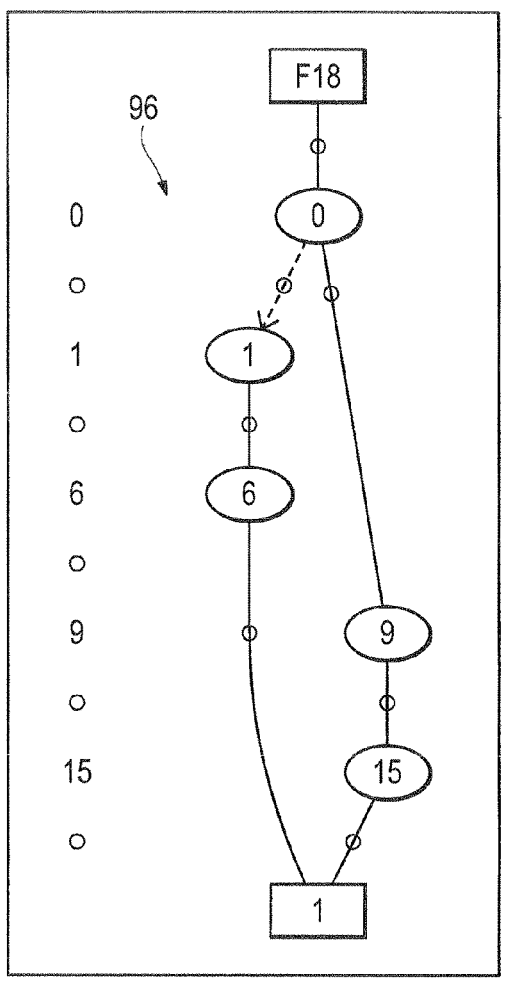
FIG. 17 shows the resulting ZDD after removing the marker nodes.

FIG. 15 shows the nodes of the "model" attribute group 3 (including marker node 12 and node 15) moved to the bottom of ZDD 90. In this position the marker node 12 can be removed since node 6 points to node 12. ZDD 92 of FIG. 16 shows the node "12" to be removed and the new path 94 from node "6" to the constant "1" node. ZDD 96 of FIG. 17 is the resulting ZDD after removing marker node "12." Marker node 6 of ZDD 96 can now be removed.

Moving the ZDD back to Normal Space

Figure 18:
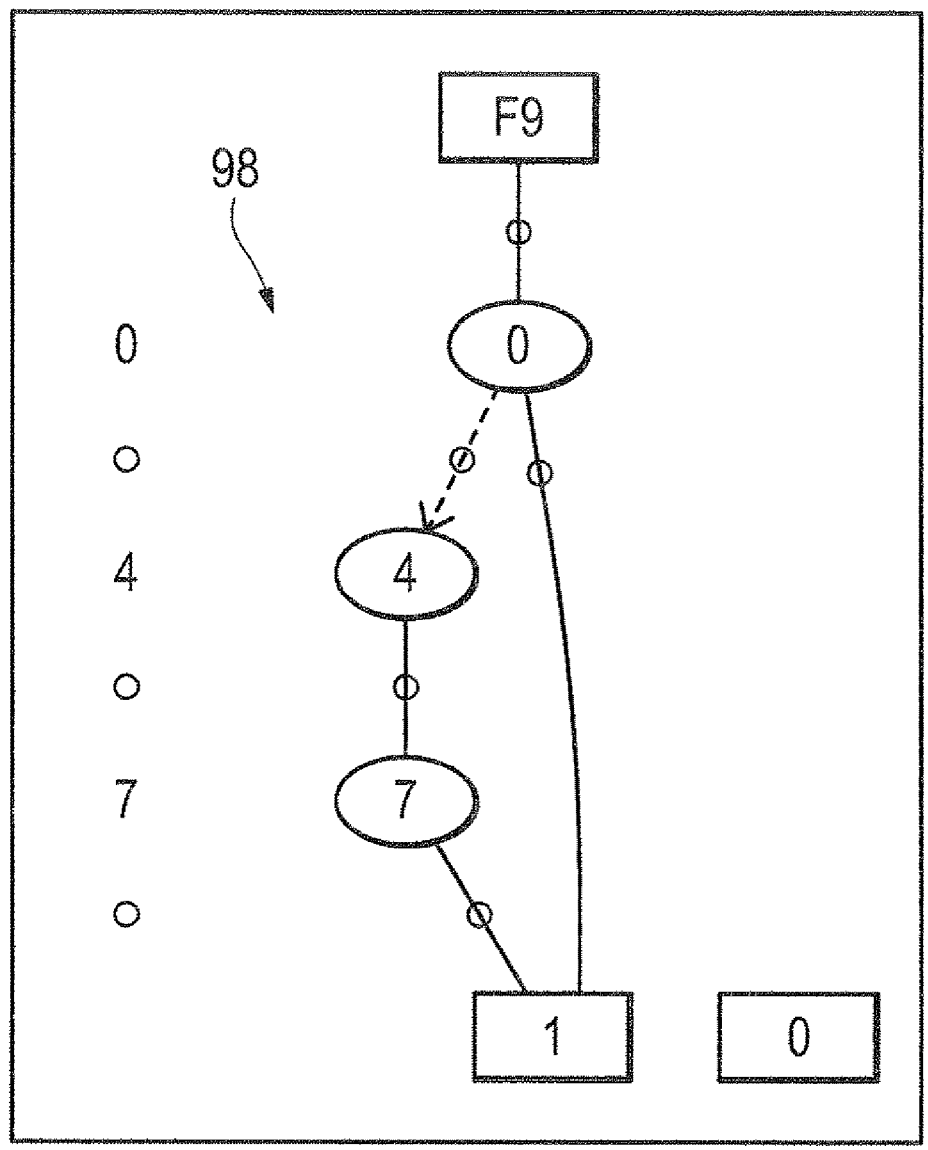
FIG. 18 shows the final result Exclude ZDD after renumbering nodes back to their initial index values, which will subsequently be combined with an Include ZDD of the overall rule to provide conflict and selection advice to a user according to the present invention.

When all of the marker nodes have been removed from the Exclude ZDD, the improvement herein effects renumbering of the node indices back to their initial values. Index 1→0, 3→1, 7→3 and so on, as shown in FIG. 18. This puts the exemplary Exclude ZDD, now an "abridged" ZDD, into a usable state. It can now be reordered and used for advice and validity determination in a computer-implemented rule processing system or method.

FIG. 18 shows the final result Exclude ZDD 98 based on the example described herein for use in producing exclude advice that is NOR'ed with an Include ZDD of the overall rule to produce conflict and selection advice. As predicted, node "0" lies on a path to 1 by itself and the cover details have been removed. At this point, manipulations described in the incorporated related disclosures are implemented using the final Exclude ZDD 98 with the Include ZDD to generate conflict and selection advice. Using the improved Exclude ZDD 98, superfluous information is removed and notations indicating further compatible selections during automated decision support become more succinct and accurate.

Based on the illustrated embodiments, the improvement herein provides improved conflict and selection advice provided during automated decision support. Extraneous, needless, superfluous information was identified and then removed from the Exclude ZDD rule component of the overall rule model. The principles herein may also be extended to binary decision diagrams (BDD) components, as well. Further, rather than employing directed acyclic graphs in the form of decision diagrams, the processes may be emulated and implemented in a rule processing system or method using conventional programming techniques. Other variations and modifications may be made without departing from the nature and scope of the invention. Accordingly, the invention is defined by the appended claims rather than the embodiments illustrated herein.

The invention claimed is:

1. A method, comprising:

storing instructions in a memory;

configuring a computing device to execute the instructions to:

obtain at least one Exclude zero-suppressed binary decision diagram (ZDD) rule component from a ZDD rule model representing a rule;

identify covers within the Exclude ZDD rule component;

remove identified covers to produce an abridged Exclude ZDD rule component by:

expanding nodes in the Exclude ZDD rule component to include all attributes specified in the rule;

identifying covers within the expanded nodes in the Exclude ZDD rule component;

marking nodes associated with the identified covers in the Exclude ZDD rule component; and removing identified covers and marked nodes from the Exclude ZDD rule component to produce the abridged Exclude ZDD rule component;

determine satisfiability of the ZDD rule model based on the abridged Exclude ZDD rule component; and generate one or more signals that provide graphical conflict advice to a user based on the satisfiability of the ZDD rule model to guide the user to achieve satisfiability of the rule.

2. The method of claim 1, further comprising configuring the computing device to execute the instructions to generate the one or more signals that provide the graphical conflict advice to the user based on the abridged Exclude ZDD rule component.

3. The method of claim 2, further comprising configuring the computing device to execute the instructions to NOR the abridged Exclude ZDD rule component with an Include ZDD of the rule to generate overall results.

4. The method of claim 3, further comprising configuring the computing device to execute the instructions to renumber nodes to provide insertion of marker nodes within an index sequence of initial nodes of the Exclude ZDD rule component.

5. The method of claim 4, further comprising configuring the computing device to execute the instructions to:
separately perform removal operations on individual transitive closure sets of the Exclude ZDD rule components; and
combine the results of respective removal operations to produce the abridged Exclude ZDD rule component.

6. The method of claim 5, further comprising configuring the computing device to execute the instructions to:
reorder nodes of the ZDD rule model so that marker node groups appear at a bottom of the ZDD rule model;
remove nodes that point to a same node as the marker node;
remove marker nodes that point to a one node; and
reorder nodes of the ZDD rule model back to an initial index.

7. A computer system, comprising:
a memory to store executable instructions including at least executable instructions to represent a rule using a zero-suppressed binary decision diagram (ZDD) rule model; and
a processor configured to execute the executable instructions stored in the memory to:
obtain at least one Exclude ZDD rule component from the ZDD rule model;
identify covers in the at least one Exclude ZDD rule component;
remove the identified covers from the at least one Exclude ZDD rule component to generate at least one abridged Exclude ZDD rule component by:
expanding nodes in the at least one Exclude ZDD rule component to include all attributes specified in the rule;
identifying covers within the expanded nodes in the at least one Exclude ZDD rule component;
marking nodes associated with the identified covers in the at least one Exclude ZDD rule component; and
removing identified covers and marked nodes from the at least one Exclude ZDD rule component to produce the at least one abridged Exclude ZDD rule component;
determine satisfiability of the ZDD rule model according to the at least one abridged Exclude ZDD rule component; and
provide graphical conflict information based on the determination of satisfiability of the ZDD rule model to achieve satisfiability of the rule represented by the ZDD rule model.

8. The system of claim 7, wherein the processor is further configured to NOR the at least one abridged Exclude ZDD rule component with an Include ZDD of the rule to generate overall results.

9. The system of claim 8, wherein the processor is further configured to renumber nodes to provide insertion of marker nodes within a sequence of initial nodes of the at least one Exclude ZDD rule component.

10. The system of claim 9, wherein the processor is further configured to separately remove individual transitive closure sets of the at least one Exclude ZDD rule component and combine results of respective separate removal operations to produce the at least one abridged Exclude ZDD rule component.

11. The system of claim 9, wherein the processor is further configured to:
reorder nodes of the ZDD rule model so that marker node groups appear at a bottom of the ZDD rule model;
remove nodes that point to a same node as the marker node;
remove marker nodes that point to a one node; and
reorder nodes of the ZDD rule model back to an initial index.

12. A computer-readable medium, comprising executable instructions, the instructions configured to instruct a computing device to:
obtain at least one Exclude ZDD rule component from a ZDD rule model representing a rule;
identify covers within the Exclude ZDD rule component;
remove identified covers to produce an abridged Exclude ZDD rule component by:
expanding nodes in the Exclude ZDD rule component to include all attributes specified in the rule;
identifying covers within the expanded nodes in the Exclude ZDD rule component;
marking nodes associated with the identified covers in the Exclude ZDD rule component; and
removing identified covers and marked nodes from the Exclude ZDD rule component to produce the abridged Exclude ZDD rule component;
determine satisfiability of the ZDD rule model based on the abridged Exclude ZDD rule component; and
provide graphical conflict information based on the satisfiability of the ZDD rule.

13. The computer-readable medium of claim 12, further comprising executable instructions configured to instruct the computing device to provide the graphical conflict information is further based on the abridged Exclude ZDD rule component.

14. The computer-readable medium of claim 12, further comprising executable instructions configured to instruct the computing device to NOR' the abridged Exclude ZDD with an Include ZDD of the rule to generate overall results.

15. The computer-readable medium of claim 12, further comprising executable instructions configured to instruct the computing device to renumber nodes to provide insertion of marker nodes within an index sequence of initial nodes of the Exclude ZDD rule component.

16. The computer-readable medium of claim 12, further comprising executable instructions configured to instruct the computing device to:
separately perform removal operations on individual transitive closure sets of the Exclude ZDD rule component; and
combine the results of respective removal operations to produce the abridged Exclude ZDD rule component.

17. The computer-readable medium of claim 12, further comprising executable instructions configured to instruct the computing device to:

reorder nodes of the ZDD rule model so that marker node groups appear at a bottom of the ZDD rule model;

remove nodes that point to a same node as the marker node;

remove marker nodes that point to a one node; and reorder reordering nodes of the ZDD rule model back to an initial index.

* * * * *

UNITED STATES PATENT AND TRADEMARK OFFICE
CERTIFICATE OF CORRECTION

PATENT NO. : 7,734,559 B2 Page 1 of 1
APPLICATION NO. : 11/527637
DATED : June 8, 2010
INVENTOR(S) : David L. Huelsman et al.

It is certified that error appears in the above-identified patent and that said Letters Patent is hereby corrected as shown below:

Page 2, Column 1 (Other Publications), line 4: Delete "Auxilary" and replace with --Auxiliary--;

Page 2, Column 2 (Other Publications), line 10: Delete "Funtions," and replace with --Functions,--;

Page 3, Column 1 (Other Publications), line 4: Delete "Patentablility;" and replace with --Patentability;--;

Page 3, Column 1 (Other Publications), line 6: Delete "Patentablility;" and replace with --Patentability;--;

Column 12, line 53 (Claim 14): Delete "NOR' the" and replace with --NOR the--; and Column 14, line 2 (Claim 17): Delete "reordering".

Signed and Sealed this

Twenty-sixth Day of October, 2010

David J. Kappos
*Director of the United States Patent and Trademark Office*